Patented Mar. 11, 1930

1,750,299

UNITED STATES PATENT OFFICE

ALFRED R. L. DOHME, OF BALTIMORE, MARYLAND, ASSIGNOR TO SHARP & DOHME, INC., OF BALTIMORE, MARYLAND, A CORPORATION OF NEW JERSEY

PRODUCTION OF ACYL RESORCINOLS

No Drawing. Application filed April 16, 1925. Serial No. 23,700.

This invention relates to an improved method of making acyl resorcinols of the general formula $C_6H_3(OH)_2.COR$ where R is an alkyl group. The process is applicable both to the production of the lower acyl resorcinols such as propionyl and butyryl resorcinols and also to the production of the higher acyl resorcinols, such as amylyl, hexylyl, heptylyl, octylyl resorcinols, etc.

In methods heretofore proposed for making certain of the acyl resorcinols, the combination of the fatty acid with the resorcinol is effected by the action of zinc chloride at elevated temperatures, the amount of zinc chloride being about equal to the weight of the fatty acid, and the resorcinol being used in the proportion e. g. of 10 parts of resorcinol to 25 parts by weight of acid. In such methods considerable amounts of tarry by-products are formed and the product is difficult to purify, while the yields are relatively small.

The improved process of the present invention enables increased yields of a product of increased purity to be obtained without the production of objectionable amounts of tarry by-products, and with advantages in the facility with which the product can be purified and obtained in a substantially pure state. The present method is well adapted for the commercial production of acyl resorcinols.

The improved process of the present invention makes use of zinc chloride for effecting the combination of the fatty acid with the resorcinol, but this combination is effected under regulated conditions of temperature, proportions and mode of addition of the ingredients, etc., whereby increased yields are obtained and a minimum of objectionable tarry by-products are formed. Instead of using an amount of zinc chloride equal to the amount of fatty acid, a radically reduced amount is used in the present process, this amount being only a small fraction of the amount of the fatty acid. The amount may be e. g., less than one-half the weight of the fatty acid and is advantageously as low as one-fifth the weight of the fatty acid. The use of such a greatly reduced amount of zinc chloride is not only advantageous in the process, reducing the tendency to form objectionable tarry by-products, but it makes it possible to free the product from the zinc chloride without difficulty.

The new process is carried out under regulated conditions of temperature, i. e. at temperatures below those at which the resorcinol is caused to condense with itself under the action of zinc chloride to form complex condensation products resembling the fluoresceins. This condensation takes place at temperatures around 150° C. or somewhat lower; and, in the present process, the temperature is regulated and maintained below a temperature which will cause such objectionable condensation. In the present process the temperature is maintained e. g. around 125 to 145°, or more advantageously around 130 to 140° C. At these temperatures the objectionable condensation of resorcinol upon itself is avoided or minimized.

In the present process, moreover, the resorcinol is added gradually and with agitation to the mixture of zinc chloride and fatty acid, thus insuring a large excess at all times of the fatty acid and an opportunity for the resorcinol, as it is added progressively in small amounts, to combine with the fatty acid so that any large amount of uncombined resorcinol is avoided. The amount of resorcinol is also advantageously reduced to around or somewhat below one-third the weight of the fatty acid.

By carrying out the process under such regulated conditions, i. e., with regulation of the temperature, with the use of a small amount of zinc chloride, and with gradual addition of the resorcinol with agitation, the process can be carried out in an advantageous manner commercially and with the production of increased yields of the acyl resorcinol and with the avoidance or minimizing of the production of objectionable amounts of tarry by-products. The product produced can, moreover, be readily purified for the recovery of the acyl resorcinol in a purified state.

The invention is, as above pointed out, of more or less general application to the production of acyl resorcinols, including e. g., the propionyl, butyryl, iso-butyryl, amylyl, iso-amylyl, hexylyl, iso-hexylyl, heptylyl, octylyl, dodecylyl resorcinols, etc.

The method of the present invention will be illustrated by the following example:

20 parts of anhydrous zinc chloride are dissolved in 100 parts of the fatty acid, the dissolution being aided by heating and stirring. 33 parts of resorcinol are gradually added at a temperature of not over 135° C. After the addition of the resorcinol, the reaction mixture is stirred for a period of about three hours while maintaining the temperature at 130 to 140° C. The oily reaction product which results is washed twice with about an equal volume of water and the washed oil is distilled in vacuo, the water and excess acid being first distilled off, and finally the acyl resorcinol, leaving only a small amount of residue after the distillation. The acyl resorcinol thus obtained in a more or less pure state may be further purified, e. g. by redistillation, crystallization, etc.

In this example the temperature can be somewhat varied, but in general it should be above 125° and not appreciably higher than 140°, the temperature being kept below that which will cause objectionable condensation of resorcinol with itself to form undesirable by-products. The mixture of zinc chloride and fatty acid is also advantageously heated to the active reaction temperature, e. g. around 125 to 140° C. before the resorcinol is added, so that reaction will take place immediately and continuously as the resorcinol is added to the reaction mixture. With some of the higher acids, especially heptylic, octylic, and lauric acids, there is a tendency to form zinc salts, and these are advantageously filtered out as their presence tends to cause serious bumping during the distillation.

At the end of the reaction, the small amount of zinc chloride is readily removed by washing with water, and only a limited amount of washing is needed. In this respect the present process is a marked improvement upon prior processes using large amounts of zinc chloride which are difficult to remove and which require a large amount of water for their removal. Since the fatty acid used, and also the acyl resorcinol formed, is soluble to a greater or less extent in water, the reduction in the amount of water required for washing the zinc chloride from the product correspondingly reduces the amount of acid and of acyl resorcinol removed by the water used for washing the product. Moreover, where large amounts of zinc chloride are used it is difficult to remove all of it, and when small amounts are left behind in the product they are objectionable. When using propionic, butyric and iso-butyric acids, which are quite soluble in water, the washings from the reaction product may be salted out to recover the excess of acids used in condensation. With the higher acids, e. g., above butyric acid, the acids are sufficiently insoluble so that this procedure is not necessary with the limited amount of washing which the present process requires.

The invention will be further illustrated by the following specific example describing the production of normal hexylyl resorcinol:

20 pounds of anhydrous zinc chloride are dissolved in 100 parts of caproic acid, the dissolution being aided by heating and stirring. While the temperature is maintained near 135° C., 33 pounds of resorcinol are gradually added over a period of about 20 minutes, and the reaction mixture is then stirred for a period of about three hours at a temperature of about 135 to 145° C. At the end of this time an equal volume of water is added and the mixture is stirred. The oily reaction product rises to the surface, is separated from the aqueous layer, and washed with an equal volume of water and the water then separated from the washed product. The washed product is then distilled in vacuo; the traces of water and the excess caproic acid being first distilled off, and finally the hexylyl resorcinol being distilled. The hexylyl resorcinol has a boiling point of about 208 to 215° at 12 mm. pressure and of about 195 to 200° C. at 8 mm. pressure. The hexylyl resorcinol may be further purified by redistillation and crystallization from a mixture of toluene and petroleum ether. On redistillation the distillate solidifies, giving a product of melting point around 52 to 55° C. Hexylyl resorcinol when crystallized from toluene-petroleum ether has a melting point of 54.5 to 56° C.

In a similar way other acyl resorcinols can be produced and obtained with high yield. The improved process of the present invention is applicable to the production of the known acyl resorcinols such as propionyl and butyryl resorcinols, and also the production of new acyl resorcinols which are claimed as new products in companion applications but which are not claimed herein. The properties of certain of these acyl resorcinols, which may be produced in accordance with the improved process of the invention, are given in the following table:

|  | Melting point | Boiling point /6-7 mm. |
|---|---|---|
| Propionyl resorcinol | 95 –96 | 176–178 |
| Butyryl resorcinol | 68 –69.5 | 186–188 |
| Amylyl resorcinol | 58.5–60 | 190–192 |
| Hexylyl resorcinol | 54.6–56 | 196–197 |
| Heptylyl resorcinol | 48 –50 | 204–206 |
| Octylyl resorcinol | 62.5–64 | 214–216 |
| Dodecylyl resorcinol | 84 –85.5 | 237–239 |
| Iso-butyryl resorcinol | 67 –68.5 | 173–175 |
| Iso-amylyl resorcinol | 108 –110 | 183–185 |
| Iso-hexylyl resorcinol | 76 –77.5 | 192–194 |

The acyl resorcinols produced by the improved process of the present invention may be obtained in a pure crystalline state or they may be produced and used in the form of oils, without final purification, e. g. for the production therefrom of alkyl resorcinols.

It will thus be seen that the present invention provides an improved process of making acyl resorcinols with increased yields and of high purity and with the avoidance of objectionable amounts of by-products; and that the process presents other advantages such as those hereinbefore referred to.

I claim:

1. The method of making acyl resorcinols which comprises heating a mixture of zinc chloride and a fatty acid to a temperature of about 125–145° C. and gradually adding resorcinol to the heated mixture.

2. The method of making acyl resorcinols which comprises mixing a fatty acid with not more than one-half its weight of zinc chloride, heating the mixture to a temperature of about 125–145° C. and gradually adding resorcinol thereto.

3. The method of making acyl resorcinols which comprises heating a mixture of zinc chloride and a fatty acid to a temperature around about 130–140° C., and gradually adding resorcinol thereto while maintaining the temperature around 130–140° C. until the reaction is completed.

4. The method of making acyl resorcinols which comprises mixing a fatty acid with about one-fifth its weight of zinc chloride, heating the mixture and adding an amount of resorcinol not exceeding about one-third the weight of the fatty acid while maintaining a temperature of about 125–145° C.

5. The method of making acyl resorcinols which comprises causing resorcinol and a fatty acid to react in the presence of zinc chloride at a temperature between about 125–145° C., the amount of zinc chloride being not more than about one-fifth the weight of the fatty acid.

6. The method of making acyl resorcinols of the general formula $C_6H_3(OH)_2 \cdot COR$ where R is an alkyl group containing at least four carbon atoms, which comprises heating a fatty acid containing at least four carbon atoms in its alkyl group together with not more than one-half its weight of zinc chloride at a temperature of about 125–145° C., and gradually adding thereto an amount of resorcinol not exceeding about one-third the weight of the fatty acid.

7. The method of making acyl resorcinols of the general formula $C_6H_3(OH)_2 \cdot COR$ where R is an alkyl group containing at least four carbon atoms, which comprises heating a mixture of a fatty acid containing at least four carbon atoms in its alkyl group with not more than one-half its weight of zinc chloride to a temperature of about 125–145° C., and gradually adding resorcinol thereto, while maintaining the mixture at a temperature of about 125–145° C.

8. The method of making acyl resorcinols of the general formula $C_6H_3(OH)_2 \cdot COR$ where R is an alkyl group containing at least four carbon atoms, which comprises causing resorcinol to combine with a fatty acid containing at least four carbon atoms in its alkyl group in the presence of zinc chloride, the amount of zinc chloride being less than one-half the weight of the fatty acid and the reaction mixture being maintained at a temperature around 125–145° C.

9. The method of making hexylyl resorcinol which comprises heating a mixture of caproic acid and not more than one-half its weight of zinc chloride to a temperature of about 125–145° C., and gradually adding resorcinol thereto.

10. The method of making hexylyl resorcinol which comprises causing resorcinol and caproic acid to combine in the presence of zinc chloride at a temperature of around 125–145° C., the amount of zinc chloride being about one-fifth the weight of the caproic acid.

11. The method of making hexylyl resorcinol which comprises dissolving zinc chloride in caproic acid with agitation and heating, the amount of zinc chloride being about one-fifth the weight of the caproic acid, gradually adding resorcinol at a temperature around 130–140° C., the amount of resorcinol being about one-third the weight of the caproic acid and the mixture being stirred while the resorcinol is added, and continuing the stirring of the reaction mixture at a temperature of about 130–145° C., to complete the reaction.

In testimony whereof I affix my signature.

ALFRED R. L. DOHME.